United States Patent [19]
Ikuta et al.

[11] Patent Number: 6,129,784
[45] Date of Patent: Oct. 10, 2000

[54] COLOR TITANATED MICA PIGMENT AND COATED-BODY USING THE SAME

[75] Inventors: Yukie Ikuta; Asa Kimura, both of Kanagawa, Japan

[73] Assignee: Shiseido Co., Ltd., Tokyo, Japan

[21] Appl. No.: 09/161,499

[22] Filed: Sep. 28, 1998

[30] Foreign Application Priority Data

Sep. 30, 1997 [JP] Japan ................................. 9-282831
Sep. 30, 1997 [JP] Japan ................................. 9-282834

[51] Int. Cl.⁷ ..................................................... C09C 1/40
[52] U.S. Cl. .......................... 106/417; 106/418; 106/439; 106/440; 106/459; 106/480
[58] Field of Search ................................. 106/417, 418, 106/439, 440, 459, 480

[56] References Cited

U.S. PATENT DOCUMENTS 3,087,828   4/1963   Linton et al. ........................... 106/417

FOREIGN PATENT DOCUMENTS

| 307747 | 3/1989 | European Pat. Off. . |
| 58-16453 | 9/1983 | Japan . |
| 59-126468 | 7/1984 | Japan . |
| 63-043962 | 2/1988 | Japan . |
| 09157557 | 6/1997 | Japan . |

*Primary Examiner*—C. Melissa Koslow
*Attorney, Agent, or Firm*—Snider & Associates; Ronald R. Snider

[57] ABSTRACT

A color titanium dioxide coated mica pigment and a coated body applied the pigment which comprise a flaky mica substrate and a composite oxide that is coated onto said mica substrate, and titanium, iron, and nickel are comprised as a metal that is composed of said composite oxide, can improve the color tone of the titanium dioxide coated mica pigment without using an organic substance and a color titanium dioxide coated mica pigment and a coated body applied the pigment which coats a titanium dioxide layer onto said composite oxide can provide a pigment which has color tone flip-flop property that the color tone changes according to the observed direction.

12 Claims, 4 Drawing Sheets

Process-1

| Raw materials | Comp. Amount (parts by weight) |
|---|---|
| Titanium dioxide coated mica | 10.00 |
| Water | 50.00 |
| FeCl₃/6H₂O | 3.36 |
| Urea | 4.48 |
| Water | 50.00 |

Process-2

| Iron/titanium dioxide coated mica | 10.00 |
|---|---|
| NiCO₃/2Ni(OH)₂/4H₂O | 1.34 |

Process-3

| Composite oxide coated mica | 10.00 |
|---|---|
| TiOSO₄/2H₂O | 19.60 |
| Water | 100.00 |

FIG.2

Process-1

| Raw materials | Comp. Amount (parts by weight) |
|---|---|
| Titanium dioxide coated mica | 10.00 |
| Water | 50.00 |
| FeCl3/6H2O | 3.36 |
| Urea | 4.48 |
| Water | 50.00 |

Stirring → Heating (100°C) → Reacting (2h) → Filtering/Washing with water (3 times) → Drying (150°C-12h) → Iron/titanium dioxide coated mica Dissolving

Process-2

| Raw materials | Comp. Amount |
|---|---|
| Iron/titanium dioxide coated mica | 10.00 |
| NiCO3/2Ni(OH)2/4H2O | 1.34 |

Mixing → Calcinating (700°C-1h) → Grinding → Composite oxide coated mica

Process-3

| Raw materials | Comp. Amount |
|---|---|
| Composite oxide coated mica | 10.00 |
| TiOSO4/2H2O | 19.60 |
| Water | 100.00 |

Stirring → Heating (100°C) → Reacting (4h) → Filtering/Washing with water (3 times) → Drying 150°C-12h → Color titanated mica pigment Dissolving

6,129,784

COLOR TITANATED MICA PIGMENT AND COATED-BODY USING THE SAME

RELATED APPLICATIONS

This application claims the priority of Japanese Patent Application No. 9-282831 filed on Sep. 30, 1997 and Japanese Patent Application No. 9-282834 filed on Sep. 30, 1997, which are incorporated herein by reference.

FIELD OF THE INVENTION

The present invention relates to a colored titanium dioxide coated mica pigment and a coated-body using the same and, in particular, to an improvement of its color tone.

BACKGROUND OF THE INVENTION

Most of the titanium dioxide coated mica pigment generates a coherent color and those are widely used as a pearl pigment. A color pigment is coexisted with the titanium dioxide coated mica pigment for the purpose of giving a specific color tone, but the color pigment is inferior in light resistance in general. Therefore, the color pigment (Japanese Examined Patent Publication Hei 4-61032 or the like) which obtained a colored appearance color by making a dark titanium lower oxides by reducing a part of a titanium dioxide layer in a titanium dioxide coated mica pigment and by emphasizing the coherent color that the titanated pigment is essentially possessed, has been developed.

Such an inorganic color pigment is extremely stable in the chemistry and is excellent in light resistance.

However, in said inorganic titanium dioxide coated mica pigment, it is difficult to sufficiently develop a color tone range of long wavelength side such as red, in particular. Accordingly, it has been expected to improve the color tone.

Also, pigments require not only a specific beautiful color tone, but also various functions in recent years. For example, the pigment, which can easily obtain color tone flip-flop property that displays a different color tone according to the observed angle, attracts people's attention from the point of view to obtain a coated-body that is difficult to make a copy by color copy.

However, the ordinary pigment only can be observed with the same color tone from every direction. Also, the ordinary pigment only can obtain the flip-flop property that the coherent color can be observed to some extent according to the observed direction by compounding a coherent material.

SUMMARY OF THE INVENTION

In view of the foregoing problems of the prior art, the first aspect of the present invention is to improve a color tone of a titanium dioxide coated mica pigment without using an organic material.

Also, the second aspect of the present invention is to provide a pigment, which has a color tone flip-flop property that the color tone changes according to the observed direction.

As a result of the diligent studies conducted by the inventors, it has been found that an excellent color tone can be obtained by forming a composite oxide layer made of titanium, iron, and nickel on the surface of mica. Further, it has been found that an excellent color tone flip-flop property can be obtained by forming a titanium dioxide layer onto said composite oxide layer. Accordingly, the present invention has been accomplished.

Namely, a color titanium dioxide coated mica pigment in accordance with the present invention is characterized in that comprises:

a flaky mica substrate; and a composite oxide that is coated onto said mica substrate, wherein titanium, iron, and nickel are comprised as a metal that is composed of said composite oxide.

Also, in said pigment, 60 to 95 wt % of titanium, 1 to 24 wt % of iron, and 1 to 24 wt % of nickel are preferable as a metal composed of said composite oxide, and said pigment is preferably a red to red purple pigment. Also, in said red to red purple pigment, it is preferable that a hue exists in a range of color difference of $\Delta ab=12.00$ (center a: 22.04, b: −6.96), in the case where the hue is displayed by Lab of Hunter, and that a value of L is within a range of 23.00 to 39.00.

Also, in said red to red purple pigment, it is preferable that a hue exists in a range of color difference of $\Delta ab=9.00$ (center a: 20.00, b: −10.00), in the case where the hue is displayed by Lab of Hunter, and that a value of L is within a range of 23.00 to 39.00.

Also, in said pigment, 30 to 60 wt % of titanium, 20 to 48 wt % of iron, and 10 to 40 wt % of nickel are preferable as a metal composed of said composite oxide, and it is preferable that a hue exists in a range of color difference of $\Delta ab=10.00$ (center a : 7.70, b: 8.01), in the case where the hue is displayed by Lab of Hunter and said pigment is a yellow to reddish brown pigment whose value of L is in a range of 19.00 to 32.00.

A color titanium dioxide coated mica pigment in accordance with the present invention is characterized in that comprises:

a flaky mica substrate;

a composite oxide layer that is coated onto said mica substrate; and a titanium dioxide layer that is coated onto said composite oxide layer, wherein titanium, iron, and nickel are comprised as a metal composed of said composite oxide.

Also, in said pigment, a coating amount of said titanium dioxide layer coated onto said composite oxide layer is preferably 3 to 100 wt % with respect to a composite oxide coated mica.

Also, in said pigment, 60 to 95 wt % of titanium, 1 to 24 wt % of iron, and 1 to 24 wt % of nickel are preferable as a metal composed of said composite oxide.

A coated-body in accordance with the present invention is characterized in that is to apply a composition that comprises any of said pigments.

Also, in said coated-body, it is preferable to apply said composition onto a substrate that brightness is 70 or less by a value of L.

Also, in said coated-body, said substrate is preferably black, blue or green.

BRIEF DESCRIPTION OF THE DRAWINGS

FIG. 2 is an explanatory view, which shows a manufacturing process of a color titanium dioxide coated mica in accordance with examples of the present invention.

BEST MODE FOR CARRYING OUT THE INVENTION

In the following, the constitution of the present invention will be further explained in detail.

Mica used in the present invention may be any of mica. Muscovite mica that is commercially available is used in general. However, biotite or the like may be used according to circumstances. A particle diameter of mica is not restricted in particular. However, among mica that are commercially available (particle diameter: about 1 to 50 μm), a mica, which has small particle diameter and which is flat as much as possible, is preferable in the case where mica is used as a pearly powder, because such mica can easily display beautiful color tone and pearliness.

In the present invention, an inorganic acid chloride solution such as titanium, iron, or nickel, is hydrolyzed in the presence of mica. Titanium dioxide or the like is educed on the surface of mica particle. A composite oxide coated mica is obtained by burning the educt at 500° C. to 1000° C. Titanium, iron, and nickel can be educed at the same time. However, these metals are preferable to educe respectively, from the point of view of adjusting eduction percentage of each metal and because each eduction condition is different. After the eduction, these metals are calcinated at 500° C. to 1000° C., thereby yielding a composite oxide.

In the present invention, a coating amount of the composite oxide with respect to mica is preferably 144 to 200 parts by weight, and more preferably, 170 to 190 parts by weight. A sufficient chroma can not be obtained in the case where the coating amount of the composite oxide is less than 144 parts by weight. Also, when the coating amount of the composite oxide is more than 200 parts by weight, the color of the pigment have a tendency to be close to the color of the composite oxide itself.

In the case where to obtain flip-flop property of the pigment, after forming a composite oxide coated mica as mentioned above, a titanium dioxide layer is further formed thereon. As a forming process of the titanium dioxide layer, as mentioned above, it is preferable to educe titanium dioxide on the surface of particle by hydrolysis method and to dry the eduction at 100° C. to 200° C.

The titanium dioxide layer that is coated on the outermost layer is preferably 3 to 100 wt %, and more preferably, is 8 to 80 wt % with respect to the composite oxide coated mica. Forming the titanium dioxide layer within this range can generate a coherent color. A color tone that the color of the composite oxide coated mica and the coherent color are mixed is generated at the angle that the coherent color can be observed. On the other hand, the color of the composite oxide coated mica is emphasized and observed at the angle that the coherent color can not be observed. As a result, flip-flop property that the color tone is different according to the observed angle is obtained.

Figure 1:
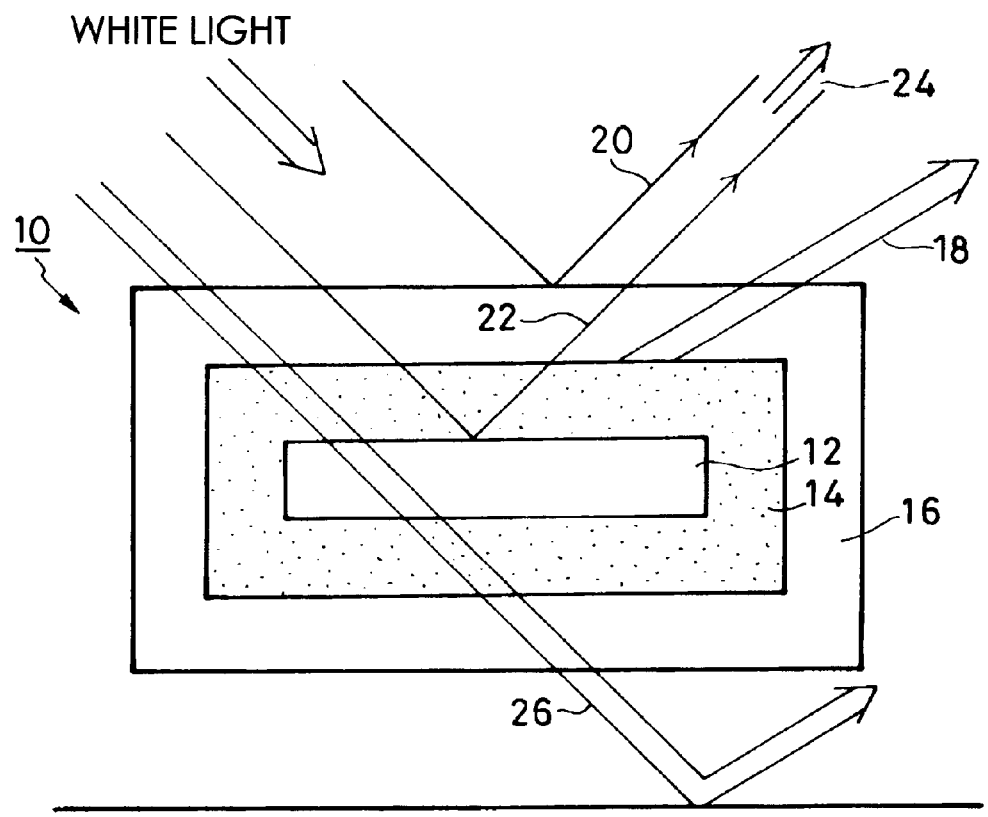
FIG. 1 is an explanatory view, which shows color tone flip-flop property of a color titanium dioxide coated mica pigment in accordance with the present invention.

A typified color titanium dioxide coated mica pigment in accordance with the present invention is shown in FIG. 1. As shown in FIG. 1, a mica 12 exists in the center of a pigment 10 and a composite oxide layer 14, which is made of titanium, iron, and nickel, is formed on the outer periphery of the mica 12. Further, a titanium dioxide layer 16 is formed on the outer periphery of the composite oxide layer 14. Said titanium dioxide layer 16 has the color tone peculiar to the composite oxide, such as red to red purple. In the case where the color tone of a reflected region is observed, though the color tone changes slightly according to the titanium dioxide layer 16, the color tone is almost red. However, a reflected light is generated at the surfaces of the titanium dioxide layer 16 and the mica 12 by a great change of refractive index. Namely, a reflected coherent light 24 of a specific color tone is generated by coherence of a reflected light 20 at the titanium dioxide layer 16 and a reflected light 22 at the surface of the mica 12.

Accordingly, the color that the reflected coherent light 24 and a general reflected light 18 are mixed is perceived from the angle that the reflected coherent light can be observed.

The pigment 10 has a relative high light transmittance. When a transmitted light 26 that has a transmissive coherent light component returns to the outside, the color tone of the reflected coherent light 24 is canceled since the transmissive coherent light component is in complementary relation ship with said reflected coherent light. Therefore, it is preferable to reduce said transmissive coherent light 26 in order to obtain color tone flip-flop property clearly.

Accordingly, a substrate to be applied the pigment in accordance with the present invention preferably has low brightness such as black, green, or blue. Further, the pigment whose value of L is 0 or more and 70 or less is preferable.

Also, in the case where a composition that comprise the color titanium dioxide coated mica pigment of the present invention is applied onto a base, a compounding amount of the pigment in the composition is not limited in particular. However, the amount of the pigment is preferably 5 to 35 wt % with respect to the whole amount of the composition. Hiding power is deteriorated when the amount of the pigment is not much. On the other hand, in the case where the amount is too much, the pigment in the composition may not dispersed in uniform, an appearance of the coated-body of the composition may be mottled, or unfavorable influences may be occurred in workability, printability, or the like by rising the viscosity of the composition.

As the substrate to be applied in the present invention, paper, paperboard, cloth, leather, metal, plastic or the like is listed. However, it is not restricted thereto in particular. Also, the various shapes are applicable in the substrate. The substrate may be processed with such that applying, printing or coating, in advance.

A binder resin compounded together with the color titanium dioxide coated mica pigment of the present invention can stick the pigment on the substrate in stable. After applying the pigment composition on the substrate, the binder resin forms a film on the substrate in the state that the solvent in the composition is volatilized and embeds the pigment. The binder resin is not restricted in particular, since the binder resin is selected according to compatibility with the substrate, film strength of a forming film, film pressure, or the like. The binder resin that is generally used as the binder of coating material or printing ink can be used. Examples of the binder include gilsonite, maleic resin, cyclorubber, hardened rosin, petroleum resin, nitrocellulose, acrylic resin, polyurethane resin, chlorinated polypropylene, vinyl chloride-vinyl acetate copolymer resin, ethylene-vinyl acetate copolymer resin, vinyl chloride, polyester resin, alkyd resin, linseed oil, modified phenol resin, fumaric resin, epoxy ester resin, epoxy amino resin, epoxy phenol resin, polyester resin, vinyl resin, polyamide resin, petroleum varnish, ketone resin, chlorinated rubber, ethyl cellulose, urea resin, melamine resin and the like.

Also, as a solvent that is compounded together with the color titanium dioxide coated mica pigment of the present invention, the solvent, which is usually used in coating material or ink, can be used. The solvent is not restricted in particular as long as the solvent can favorably dissolve the binder resin and improve its operation, and also can satisfactory disperse and compound the color pigment into the resin solution. Examples of the solvent include toluene, xylene, n-hexane, cyclohexane, methyl acetate, ethyl acetate, isopropyl acetate, n-propyl acetate, n-butyl acetate, isobutyl acetate, methanol, ethanol, n-propyl alcohol, isopropyl alcohol, n-butyl alcohol, isobutyl alcohol, acetone, methyl ethyl ketone, methyl isobutyl ketone, propylene glycol monomethyl ether, ethylene glycol monomethyl acetate, ethylene glycol monoethyl ether, ethylene glycol monoethyl ether acetate and the like.

A volatile organic solvent is mainly used as the solvent. Water or the like may be compounded as the solvent.

When the color titanium dioxide coated mica pigment of the present invention is used, in addition to said essential ingredients, various additives that are usually compounded into coating material or ink may be compounded within the range that the effect of the present invention is not spoiled, so as to adjust the properties of the composition. For example, plasticizers, waxes, humectants, stabilizers, dyes, antistatic agents, anti-forming agents, antioxidants, leveling agents, polymerization inhibitors, fillers, or the like are included.

In the present invention, in order to obtain a color and high brilliant impression, and an excellent color tone, a weight ratio between the color pigment and the binder resin in the coating material composition is preferably 1:20 to 3.5:10. When such the coating material composition is applied onto the substrate, the solvent in the composition is volatilized by drying and a binder resin film is formed on the substrate. The color pigment is held into the film, thereby forming a coating film. Accordingly, in the coating film on the substrate, the weight ratio between the color pigment and the binder resin exist within the range of 1:20 to 3.5: 10. The coating film that has such composition ratio provides the substrate with color appearance and high brilliant impression, and demonstrates a favorable color tone.

Also, in the coated-body that the coating material composition, which uses the pigment in accordance with the present invention, is coated onto the substrate, a geometrical film thickness of the coating film after drying is preferably 0.01 to 0.07 mm. In the case where the film thickness of the coating film is not much, appearance color with the pigment is weak and hiding is low. Consequently, satisfactory color tone, glossiness, or flip-flop effect may not be obtained. On the other hand, the coating film does not spread well and may become mottled in the case where the film thickness of the coating film is too much. Accordingly, appearance of the coating film is difficult to become uniform, and glossiness or flip-flop effect has a tendency to decrease.

A method for coating in the present invention is the method for coating the composition that comprises the pigment of the present invention onto a part or a whole part of the surface of the substrate. Its concept includes a general printing method. A method for applying includes a general application method, printing method or coating technology. Examples of the printing method include letterpress printing, intaglio printing, gravure printing, screen printing, flexo printing, offset printing, electrostatic printing, or the like. Also, the application method such as brush application, spray coating, drum coating, stencil application, electrostatic coating, flow coating, dip coating, roller coating or spray coating can be used.

EXAMPLES

Manufacturing Example 1

Composite Oxide Coated Mica

A manufacturing process of the color titanium dioxide coated mica in accordance with the first example of the present invention will be explained according to Process-1 and Process-2 shown in FIG. 2.

(Process-1)

50 Parts by weight of water was added to 10.00 parts by weight of titanium dioxide coated mica (particle diameter: 12 μm, coating amount of titanium dioxide with respect to mica: 138 wt %), and the mixture was stirred and dispersed. To the dispersion was added a dissolution that 3.36 parts by weight of iron chloride ($FeCl_3/6H_2O$), 4.48 parts by weight of urea, 50 parts by weight of water were mixed. The mixture was heated under stirring and reacted for 2 hours. Thus generated iron/titanium dioxide coated mica was filtered and washed and then dried for 12 hours at 150° C.

(Process-2)

1.34 Parts by weight of nickel carbonate/nickel hydroxide hydrate was added to and mixed with 10.00 parts by weight of thus obtained iron/titanium dioxide coated mica. Then the mixture was calcinated for 1 hour at 700° C. and thereby yielding a composite oxide of titanium, iron, and nickel. After calcinating the mixture, a red composite oxide coated mica was obtained by grinding the mixture.

In the resulting composite oxide coated mica, coating amount of the composite oxide with respect to mica was 183 wt %, and percentage of metal between titanium, iron, and nickel was 71.60 wt %, 14.20 wt %, 14.20 wt %, respectively.

Color Tones of Composite Oxide and Composite Oxide Coated Mica

A difference of color tones of the composite oxide and said composite oxide coated mica was studied.

A comparison of the color tone was conducted using each the specimens shown in TABLE 1. These specimens were applied to a black paper using a doctor blade. After drying the obtained color paper, the specimen for measurement was cut to the size of 20×100 mm. Colorimetry of the specimen was observed by naked-eye and by a goniospectrophotometer (GCMS-3) manufactured by Murakami Color Lab (under the conditions where 45° of the incident light angle and 35 to 65° of the light receiving angle). The thickness of the coating after the specimen for measurement was dried was 0.016 mm.

TABLE 1

| Specimen | |
|---|---|
| Nitrocellulose | 15 wt % |
| Butyl cellosolve | 10 |
| Naphtha | 10 |
| Cyclohexane | 20 |
| | 45 |

The result is shown in TABLE 2.

TABLE 2

|  | 35° | | | 65° | | | Observed Color |
|---|---|---|---|---|---|---|---|
|  | L | a | b | L | a | b | with Naked Eye |
| ①Composite oxide | 83.17 | 7.59 | 8.47 | 81.25 | 7.34 | 8.10 | Pink |
| ②Composite oxide and mica | 89.19 | 6.06 | 7.46 | 73.71 | 7.37 | 7.14 | Pink |
| ③Composite oxide coated mica | 87.31 | 50.23 | −45.70 | 66.16 | 54.21 | −33.98 | Purple |

As shown in TABLE 2, ③ the composite oxide coated mica displayed a different color as compared to the colors shown in ① the composite oxide only which had the same metal percentages and ② the mixture that was the same composition with ③ the composite oxide coated mica and that the composite oxide and mica were simply mixed. Accordingly, it was understood that a titanium dioxide coated mica pigment of the present invention had the color tone that was obtained peculiarly by coating the composite oxide onto mica.

Influence by Color of Substrate

The present inventors further studied the relationship between the color tone of the substrate (colored paper) that the color titanium dioxide coated mica (composite oxide coated mica) in accordance with the first example was applied, and the color tone of the coated-body.

As a result of TABLE 3, the color titanium dioxide coated mica pigment in accordance with the present invention can obtain the excellent color tone by applying to the substrate that is low brightness such as black, blue, or green and preferably, the substrate whose value of L is 0 or more and 70 or less.

Metallic Composition of Composite Oxide

TABLE 4 shows the changes of color tone when the composite oxide contained various percentages of titanium, iron, and nickel.

Red to Red Purple Color Tone

TABLE 3

|  | Color of Substrate | | | Color of Coated-Body | | | Observed Color |
|---|---|---|---|---|---|---|---|
| Color of Substrate | L | a | b | L | a | b | with Naked Eye |
| White | 90.70 | 2.35 | −1.71 | 51.60 | 27.72 | 15.64 | Vermilion |
| Black | 12.81 | 0.43 | −0.48 | 26.41 | 18.47 | −13.33 | Purple |
| Red | 38.70 | 63.30 | 20.99 | 33.33 | 40.88 | −0.96 | Purple |
| Yellow | 76.48 | −0.67 | 47.58 | 44.11 | 23.52 | 11.53 | Purple |
| Blue | 24.76 | 10.85 | −70.51 | 25.25 | 12.35 | −16.97 | Violet |
| Green | 36.37 | −36.73 | 15.01 | 28.35 | 4.19 | −9.17 | Violet |

TABLE 4

|  |  | Titanium | Iron | Nickel | L | a | b | Observed color |
|---|---|---|---|---|---|---|---|---|
| Test Example | 1-1 | 92.59 | 4.63 | 2.78 | 36.78 | 21.86 | −6.73 | Red purple |
|  | 1-2 | 90.90 | 4.55 | 4.55 | 36.08 | 22.04 | −6.96 | Red purple |
|  | 1-3 | 88.50 | 8.85 | 2.65 | 30.45 | 25.07 | −9.24 | Red purple |
|  | 1-4 | 86.95 | 8.70 | 4.35 | 29.44 | 24.04 | −10.10 | Red purple |
|  | 1-5 | 86.95 | 4.35 | 8.70 | 35.64 | 22.24 | −6.50 | Red purple |
|  | 1-6 | 83.34 | 8.33 | 8.33 | 30.19 | 24.92 | −9.45 | Red purple |
|  | 1-7 | 81.30 | 6.26 | 2.44 | 25.89 | 20.79 | −14.84 | Violet |
|  | 1-8 | 80.00 | 16.00 | 4.00 | 25.59 | 20.54 | −14.64 | Violet |
|  | 1-9 | 80.00 | 4.00 | 16.00 | 35.20 | 20.51 | −6.36 | Red purple |
|  | 1-10 | 76.93 | 15.38 | 7.69 | 25.01 | 18.43 | −15.61 | Violet |
|  | 1-11 | 76.93 | 7.69 | 15.38 | 29.74 | 23.62 | −10.45 | Purple |
|  | 1-12 | 71.43 | 14.29 | 14.29 | 25.12 | 15.50 | −15.37 | Violet |
|  | 1-13 | 59.00 | 20.50 | 20.50 | 24.39 | −1.40 | −0.60 | Brown |
|  | 1-14 | 96.00 | 2.00 | 2.00 | 41.30 | 10.25 | −3.71 | Low chroma red purple |
|  | 1-15 | 90.00 | 0.50 | 9.50 | 32.80 | −1.28 | 7.80 | Yellow |
|  | 1-16 | 62.50 | 25.00 | 12.50 | 23.38 | 1.28 | −5.12 | Low chroma purple |
|  | 1-17 | 90.65 | 8.85 | 0.50 | 30.45 | 25.07 | −4.24 | Red Purple |
|  | 1-18 | 62.50 | 12.50 | 25.00 | 26.20 | 5.66 | −16.41 | Purple |
|  | 1-19 | 66.67 | 6.67 | 26.67 | 29.46 | 7.78 | −6.81 | Low chroma purple |
|  | 1-20 | 68.96 | 3.45 | 27.59 | 34.81 | 9.42 | −5.64 | Low chroma purple |

As shown in test examples 1-1 to 1-12 of TABLE 4, when the percentages of titanium, iron, and nickel in the composite oxide were within the range of 60 to 95 wt %, 1 to 24 wt %, 1 to 24 wt %, respectively, a red to purple color were observed. This color existed in the range of color difference of Δab=12.00 (center a: 22.04, b: −6.96), in the case where the color was displayed by Lab of Hunter. This color tone area was difficult to detect when titanium, iron, or nickel was separately used and was viewed excellent red to red purple.

Further, test example 1-2 was within the range of Δab= 9.00 (center a: 20.00, b: −10.00) in the case where the color tone was displayed by Lab of Hunter and became excellent color tone as red to red purple.

On the other hand, in the case where each component was over the predetermined range (test examples 1-13 to 1-20), it was difficult to obtain beautiful red to red purple color tone (as in test examples 1 -1 to 1 -12).

TABLE 5 shows the metallic compositions so as to obtain brown color tone.

Brown (Yellow to Reddish Brown) Color Tone

TABLE 5

|  |  | Titanium | Iron | Nickel | L | a | b | Observed color |
|---|---|---|---|---|---|---|---|---|
| Test Example | 1-21 | 55.56 | 22.22 | 22.22 | 24.39 | 1.90 | 0.60 | Yellow brown |
|  | 1-22 | 50.00 | 30.00 | 20.00 | 22.83 | 6.81 | 7.12 | Yellow brown |
|  | 1-23 | 45.46 | 36.36 | 18.18 | 21.65 | 13.44 | 4.71 | Brown |
|  | 1-24 | 45.46 | 27.27 | 27.27 | 24.42 | 3.39 | 8.67 | Yellow brown |
|  | 1-25 | 41.67 | 33.33 | 25.00 | 21.70 | 14.36 | 6.86 | Brown |
|  | 1-26 | 41.67 | 25.00 | 33.33 | 26.56 | 1.74 | 10.82 | Yellow brown |
|  | 1-27 | 38.46 | 30.77 | 30.77 | 21.78 | 10.31 | 7.90 | Brown |
|  | 1-28 | 20.00 | 40.00 | 40.00 | 18.65 | 1.04 | 0.82 | Black |
|  | 1-29 | 29.00 | 41.00 | 30.00 |  |  |  | Pigmentized (aggregated) and no brilliant impression |
|  | 1-30 | 61.00 | 25.00 | 14.00 | 23.38 | 1.28 | −3.12 | Low chroma red purple |
|  | 1-31 | 45.46 | 18.18 | 36.36 | 29.69 | −6.60 | 4.37 | Green |
|  | 1-32 | 60.00 | 19.00 | 21.00 | 26.2 | 7.66 | −16.41 | Red Purple |
|  | 1-33 | 30.00 | 49.00 | 21.00 |  |  |  | Pigmentized (aggregated) and no brilliant impression |
|  | 1-34 | 35.00 | 50.00 | 15.00 | 17.39 | 2.06 | 1.14 | Black |
|  | 1-35 | 55.00 | 36.00 | 9.00 | 23.71 | 0.62 | 3.15 | Low chroma red |
|  | 1-36 | 35.40 | 23.60 | 41.00 |  |  |  | Pigmentized (aggregated) and no brilliant impression |

As shown in test examples 1-21 to 1-27 of TABLE 5, when the percentages of titanium, iron, and nickel in the composite oxide were within the range of 30 to 60 wt %, 1 to 24 wt %, 1 to 24 wt %, respectively, a brown color were observed. This color existed in the range of color difference of Δab=10.00 (center a: 7.70, b:8.01), in the case where the color was displayed by Lab of Hunter.

On the other hand, in the case where each component was over the predetermined range (test examples 1-28 to 1-36), the result was unsatisfactory in the point to obtain excellent brown color tone.

In the following, compounding examples that is used the color titanium dioxide coated mica pigment in accordance with the first example will be listed. However, the present invention is not limited thereto. A compounding amount will be expressed by wt % unless otherwise limited.

Compounding Example 1-1 Gravure Ink

| Color titanium dioxide coated mica pigment | 30.0% |
|---|---|
| Ethylene-vinylacetate copolymer | 7.5 |
| Chlorinated polypropylene | 5.5 |
| Toluene | 28.0 |

-continued

| Ethyl acetate | 8.5 |
|---|---|
| Methyl ethyl ketone | 17.0 |
| Isopropyl alcohol | 2.5 |
| Polyethylene wax | 0.8 |
| Antistatic agent | 0.2 |

Compounding Example 1-2 Gravure Ink

| Color titanium dioxide coated mica pigment | 15.0% |
|---|---|
| Polyamide resin | 15.0 |
| Rosin ester | 4.0 |
| Nitrocellulose | 3.0 |
| Isopropyl alcohol | 46.0 |
| Ethyl acetate | 5.0 |

-continued

| Toluene | 10.0 |
|---|---|
| Polyethylene wax | 2.0 |

Compounding Example 1-3 Gravure Ink

| Color titanium dioxide coated mica pigment | 20.0% |
|---|---|
| Hardened rosin | 15.0 |
| Petroleum resin | 10.0 |
| Toluene | 55.0 |

Compounding Example 1-14 Gravure Ink

| Color titanium dioxide coated mica pigment | 30.0% |
|---|---|
| Nitrocellulose | 10.0 |
| Butyl cellosolve | 10.0 |
| Naphtha | 25.0 |
| Cyclohexane | 25.0 |

Compounding Example 1-5 Gravure Ink

| Color titanium dioxide coated mica pigment of manufacturing example 1 | 14.0% |
|---|---|
| Ethylene-vinylacetate copolymer | 7.2 |
| Chlorinated polypropylene | 5.8 |
| Toluene | 58.0 |
| Ethyl acetate | 11.0 |
| Isopropyl alcohol | 3.0 |
| Polyethylene wax | 0.8 |
| Antistatic agent | 0.2 |

Compounding example 1-6 Screen Ink

| Color titanium dioxide coated mica pigment | 15.0% |
|---|---|
| Acrylic resin | 20.0 |
| Naphtha | 35.0 |
| Butyl cellosolve | 30.0 |

Compounding Example 1-7 Screen Ink

| Color titanium dioxide coated mica pigment | 15.0% |
|---|---|
| Nitrocellulose | 15.0 |
| Cyclohexane | 40.0 |
| Isophorone | 10.0 |
| Naphtha | 10.0 |
| Dibutylphthalate | 10.0 |

Compounding Example 1-8 Screen Ink

| Color titanium dioxide coated mica pigment | 20.0% |
|---|---|
| Nitrocellulose | 20.0 |
| Cyclohexane | 45.0 |
| Isophorone | 10.0 |
| Dioctylphthalate | 5.0 |

Compounding Example 1-9 Screen Ink

| Color titanium dioxide coated mica pigment | 15.0% |
|---|---|
| Acrylic resin | 20.0 |
| Naphtha | 35.0 |
| Butyl cellosolve | 30.0 |

Compounding Example 1-10 Screen Ink

| Color titanium dioxide coated mica pigment | 15.0% |
|---|---|
| Acrylic resin | 20.0 |
| Naphtha | 35.0 |
| Butyl cellosolve | 30.0 |

As explained above, according to the color titanium dioxide coated mica in accordance with the first example of the present invention, coating titanium, iron, and nickel onto the flaky mica substrate can develop the color tone that is difficult to obtain with the inorganic substance only.

Also, a red to red purple color tone can be obtained by adjusting the percentages of the metals that are composed of said composite oxide to 60 to 95 wt % of titanium, 1 to 24 wt % of iron, and 1 to 24 wt % of nickel.

Also, a yellow to reddish brown color tone can be obtained by adjusting the percentages of the metals that are composed of said composite oxide to 30 to 60 wt % of titanium, 20 to 48 wt % of iron, and 10 to 40 wt % of nickel.

Also, a color of the pigment can be clearly demonstrated by applying the pigment in accordance with the first example of the present invention onto the substrate whose value of L is 70 or less.

Manufacturing Example 2

Titanium Dioxide/Composite Oxide Coated Mica

A manufacturing process of the color titanium dioxide coated mica in accordance with the second example of the present invention will be explained according to FIG. 2.

(Process-1 & 2)

A composite oxide was obtained by the same process as like manufacturing example 1 according to Process-1 and Process 2 of FIG. 2.

(Process-3)

Then, 10 parts by weight of said composite oxide coated mica was added to a solution where 19.60 parts by weight of titanium sulfate was dissolved into 100 parts by weight of water. The mixture was reacted for 4 hours with heating up to 100° C. while stirring. After the manufactured hydrous titanium dioxide/composite oxide coated mica was filtered and washed with water, titanium dioxide/composite oxide coated mica was obtained by drying for 12 hours at 150° C.

Also, in the obtained titanium dioxide/composite oxide coated mica, the percentage of the composite oxide to mica was 184 wt % and the percentage of titanium dioxide to the composite oxide coated mica was 80 wt %. The optical layer thickness of titanium dioxide/composite oxide coated mica was approximately 630 nm and the interference color of the titanium dioxide/composite oxide coated mica was green.

Color Tone of Titanium Dioxide/Composite Oxide Coated Mica

Then, the present inventors studied specificity of the color tone of the color titanium dioxide coated mica.

A comparison of the color tone was conducted using each the specimens shown in TABLE 1 that was mentioned above. These specimens were applied to a black paper using a doctor blade. After drying the obtained color paper, the specimen for measurement was cut to the size of 20×100 mm. Colorimetry of the specimen was observed by naked-eye and by a goniospectrophotometer (GCMS-3) manufactured by Murakami Color Lab (under the conditions where 45° of the incident light angle and 35 to 65° of the light receiving angle). The thickness of the coating after the specimen for measurement was dried was 0.016 mm.

The result is shown in TABLE 6.

TABLE 6

|  | 45° Observed | | | | 65° Observed | | | |
| --- | --- | --- | --- | --- | --- | --- | --- | --- |
|  | L | a | b | Color | L | a | b | Color |
| ①Composite oxide | 109.71 | 6.33 | 13.53 | Pink | 84.69 | 5.82 | 7.06 | Pink |
| ②Composite oxide coated mica | 208.60 | 28.70 | −9.91 | Purple | 66.16 | 54.21 | −33.98 | Red purple |
| ③Composite oxide coated mica | 193.70 | 8.86 | −6.97 | White-green | 74.75 | 19.48 | −23.62 | White-red |
| ③Titanium dioxide/composite oxide coated mica | 204.29 | 3.44 | 8.07 | Green | 67.72 | 9.00 | −14.55 | Red |

The numbers shown in TABLE 6 represent:

①: the composite oxide only which has the same metal percentages as in manufacturing example 1;

②: the composite oxide coated mica obtained by Process-2 of manufacturing example 2:

③: the composite oxide which was first coated with total titanium dioxide on mica and then was coated iron and nickel on the mica; and ④: titanium dioxide/composite oxide coated mica which was obtained by manufacturing example 2.

As shown in TABLE 6, titanium dioxide/composite oxide coated mica displayed a different color as compared to the colors shown in the composite oxide coated mica and the composite oxide only, respectively, even in the case where the titanium dioxide/composite oxide coated mica, the composite oxide coated mica, and the composite oxide only were all having the same metal compositions. In particular, the color tone flip-flop property was clearly observed in titanium dioxidelcomposite oxide coated mica. This property was hardly observed in the composite oxide mica. Accordingly, a color titanium dioxide coated mica pigment which shows specific color tone and flip-flop property can be obtained by first coating the composite oxide on mica and then further adding a titanium dioxide layer onto the composite oxide coated mica.

Also, the product in the present example ④ changed from low chroma red through blue, red again, to purple according to the angle of observation.

Opposite to ④ composite oxide coated mica shown in ③ was made by coating total titanium dioxide on mica first followed be coating iron and nickel on the titanium dioxide coated mica. This titanium dioxidelcomposite oxide coated mica displayed a color from yellow through blue to purple. However, all composite oxides prepared in this procedure were considerably whitish and the degree of discoloration was small.

A possible explanation with regard to the display of whitish color in the composite oxide of ③ is that because the total titanium dioxide has been coated onto mica in advance so that the percentages of iron and nickel are relatively lower and the impact of titanium dioxide (white) is relatively stronger. The composite oxide is composed of titanium, iron, and nickel.

Influence by Color of Substrate

The present inventors further studied the relationship between the color tone of the substrate (colored paper) that the color titanium dioxide coated mica (composite oxide coated mica) in accordance with the manufacturing example 2 was applied, and the color tone of the coated-body.

TABLE 7

| Color of Substrate | Color of Substrate | | | Color of Coated-Body | | | Observed Color with Naked Eye |
| --- | --- | --- | --- | --- | --- | --- | --- |
|  | L | a | b | L | a | b |  |
| White | 90.70 | 2.35 | −1.71 | 63.61 | 13.41 | 16.20 | Brown |
| Black | 12.81 | 0.43 | −0.48 | 27.22 | −3.00 | −2.75 | Green |
| Red | 38.70 | 63.30 | 20.99 | 40.08 | 33.07 | 10.22 | Red Purple |
| Yellow | 76.48 | −0.67 | 47.58 | 54.53 | 14.63 | 24.46 | Yellow brown |
| Blue | 24.76 | 10.85 | −70.51 | 30.42 | −2.69 | −12.64 | Bluish green |
| Green | 36.37 | −36.73 | 15.01 | 34.60 | −13.20 | 3.50 | Green |

As a result of TABLE 7, the color titanium dioxide coated mica pigment in accordance with the second example can obtain the excellent dichroism by applying to the substrate that is low brightness such as black, blue, or green and preferably, the substrate whose value of L is 0 or more and 70 or less.

Figure 3:
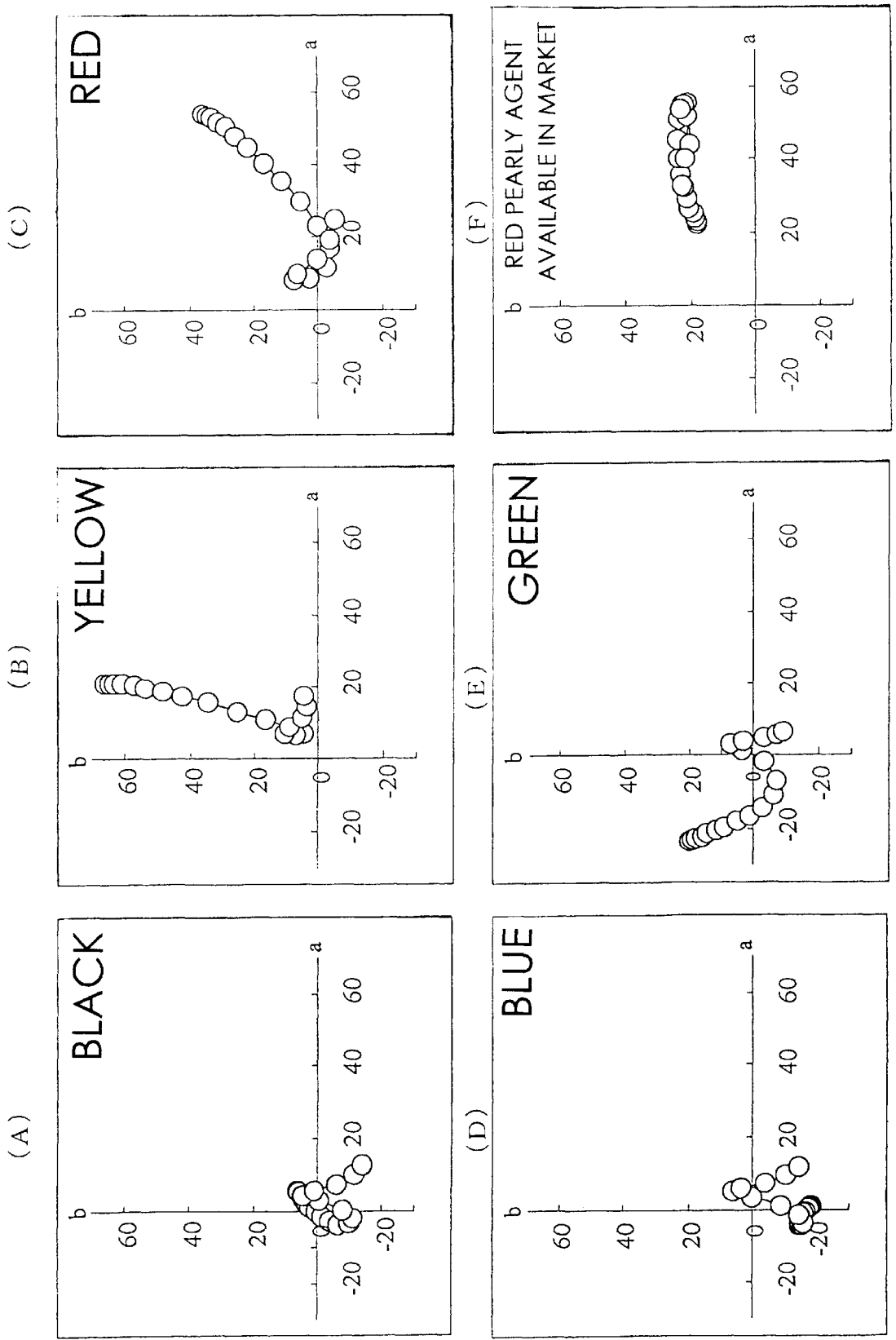
FIG. 3 is an explanatory view, which shows a difference of the flip-flop property in the case where a color titanium dioxide coated mica pigment in accordance with the example of the present invention is applied onto the various colored papers.

FIG. 3 explained the result of colorimetry with goniospectrophotometer in detail when thus obtained color titanium dioxide coated mica pigment was applied onto various colored papers.

Namely, the color titanium dioxide coated mica pigment was applied onto various colored papers such as black, yellow, red, blue, and green, then the changes of their color tones when the incident light angle was −45° and the light receiving angle was changed from −25° to 65°, were studied. As a result, when the color titanium dioxide coated mica pigment was applied onto the papers that had low brightness such as black, blue, and green, the change of hue was large. However, when the color titanium dioxide coated mica pigment was applied onto the papers that had high brightness such as yellow and red, though chroma was changed, but hue was hardly changed. Among these papers, blue and green papers can reflect their own color and demonstrates high chroma blue and green, respectively. However, black paper that displays the color of the powder demonstrated the largest discoloration. Also, when the product that applied titanium dioxide/composite oxide coated mica was applied onto black paper, and the product that applied red brilliant powder, which coated iron oxide onto mica and which was commercially available, onto black paper were compared, the latter demonstrated smaller change in hue and chroma than the former.

Metallic Composition of Composite Oxide

TABLE 8 shows the changes of color tone when the composite oxide contained various percentages of titanium, iron, and nickel.

TABLE 8

|  |  | Titanium | Iron | Nickel | L | a | b | Observed color |
|---|---|---|---|---|---|---|---|---|
| Test Example | 2-1 | 92.59 | 4.63 | 2.78 | 36.78 | 21.86 | −6.73 | Red purple |
|  | 2-2 | 90.90 | 4.55 | 4.55 | 36.08 | 22.04 | −6.96 | Red purple |
|  | 2-3 | 88.50 | 8.85 | 2.65 | 30.45 | 25.07 | −9.24 | Red purple |
|  | 2-4 | 86.95 | 8.70 | 4.35 | 29.44 | 24.04 | −10.10 | Red purple |
|  | 2-5 | 86.95 | 4.35 | 8.70 | 35.64 | 22.24 | −6.50 | Red purple |
|  | 2-6 | 83.34 | 8.33 | 8.33 | 30.19 | 24.92 | −9.45 | Red purple |
|  | 2-7 | 81.30 | 6.26 | 2.44 | 25.89 | 20.79 | −14.84 | Violet |
|  | 2-8 | 80.00 | 16.00 | 4.00 | 25.59 | 20.54 | −14.64 | Violet |
|  | 2-9 | 80.00 | 4.00 | 16.00 | 35.20 | 20.51 | −6.36 | Red purple |
|  | 2-10 | 76.93 | 15.38 | 7.69 | 25.01 | 18.43 | −15.61 | Violet |
|  | 2-11 | 76.93 | 7.69 | 15.38 | 29.74 | 23.62 | −10.45 | Purple |
|  | 2-12 | 71.43 | 14.29 | 14.29 | 25.12 | 15.50 | −15.37 | Violet |
|  | 2-13 | 59.00 | 20.50 | 20.50 | 24.39 | −1.40 | −0.60 | Brown |
|  | 2-14 | 96.00 | 2.00 | 2.00 | 41.30 | 10.25 | −3.71 | Low chroma red purple |
|  | 2-15 | 90.00 | 0.50 | 9.50 | 32.80 | −1.28 | 7.80 | Yellow |
|  | 2-16 | 62.50 | 25.00 | 12.50 | 23.38 | 1.28 | −5.12 | Low chroma purple |
|  | 2-17 | 90.65 | 8.85 | 0.50 | 30.45 | 25.07 | −4.24 | Red Purple |
|  | 2-18 | 62.50 | 12.50 | 25.00 | 26.20 | 5.66 | −16.41 | Purple |
|  | 2-19 | 66.67 | 6.67 | 26.67 | 29.46 | 7.78 | −6.81 | Low chroma purple |
|  | 2-20 | 68.96 | 3.45 | 27.59 | 34.81 | 9.42 | −5.64 | Low chroma purple |

As shown in test examples 2-1 to 2-12 of TABLE 8, when the percentages of titanium, iron, and nickel in the composite oxide were within the range of 60 to 95 wt %, 1 to 24 wt %, 1 to 24 wt %, respectively, a red to purple color were observed. This color existed in the range of color difference of Δab=12.00 (center a: 22.04, b: −6.96), in the case where the color was displayed by Lab of Hunter. This color tone area was difficult to detect when titanium, iron, or nickel was separately used and was viewed excellent red or red purple.

Further, test example 2-2 was within the range of Δab= 9.00 (center a: 20.00, b: −10.00) in the case where the color tone was displayed by Lab of Hunter and became excellent color tone as red to red purple.

On the other hand, in the case where each component was over the predetermined range (test examples 2-13 to 2-20), it was difficult to obtain beautiful red to red purple color tone (as in test examples 2-1 to 2-12).

Amount of Titanium Dioxide

Next, the present inventors changed the amounts of titanium dioxide to observe the changes in color tone.

Namely, various samples were applied on a black and a white paper, and the samples were observed. The results were shown in FIG. 4.

As a result of this, although the interference color of titanium dioxide/composite oxide coated mica was purple when the coating amount of titanium dioxide to composite oxide coated mica was 0 wt %, the interference color of titanium dioxide/composite oxide coated mica was changed to blue, green, and low chroma blue when the coating amounts of titanium dioxide were 8%, 20%, and 80%, respectively. Also, the color tone of the products coated with 80% of titanium dioxide changed from bluish green to red by changing the angle of the products coated on black paper.

Next, the color tones of the products that the coating amount of titanium dioxide to the composite oxide coated mica were changed were observed under the conditions where −45° of the incident light angle and 45° (regular reflection) and 65° (diffused reflection) of the light receiving angle. The result is shown in TABLE 9.

TABLE 9

| Coating Amount of | 45° | | | 65° | | | Observed Color |
|---|---|---|---|---|---|---|---|
| Titanium Dioxide | L | a | b | L | a | b | with Naked Eye |
| 2% | 208.81 | 23.13 | −10.12 | 66.22 | 53.51 | −33.58 | Almost same color with non-coating product |
| 3% | 220.53 | 18.23 | −8.26 | 62.99 | 41.61 | −45.06 | Color tone flip-flop property was observed |
| 100% | 204.70 | −4.10 | 12.71 | 68.04 | −10.38 | −6.18 | Color tone flip-flop property was obtained |
| 101% | 205.80 | −3.09 | 13.64 | 69.11 | −11.68 | −5.59 | Interfering color was disappeared and being whitish |

Figure 4:
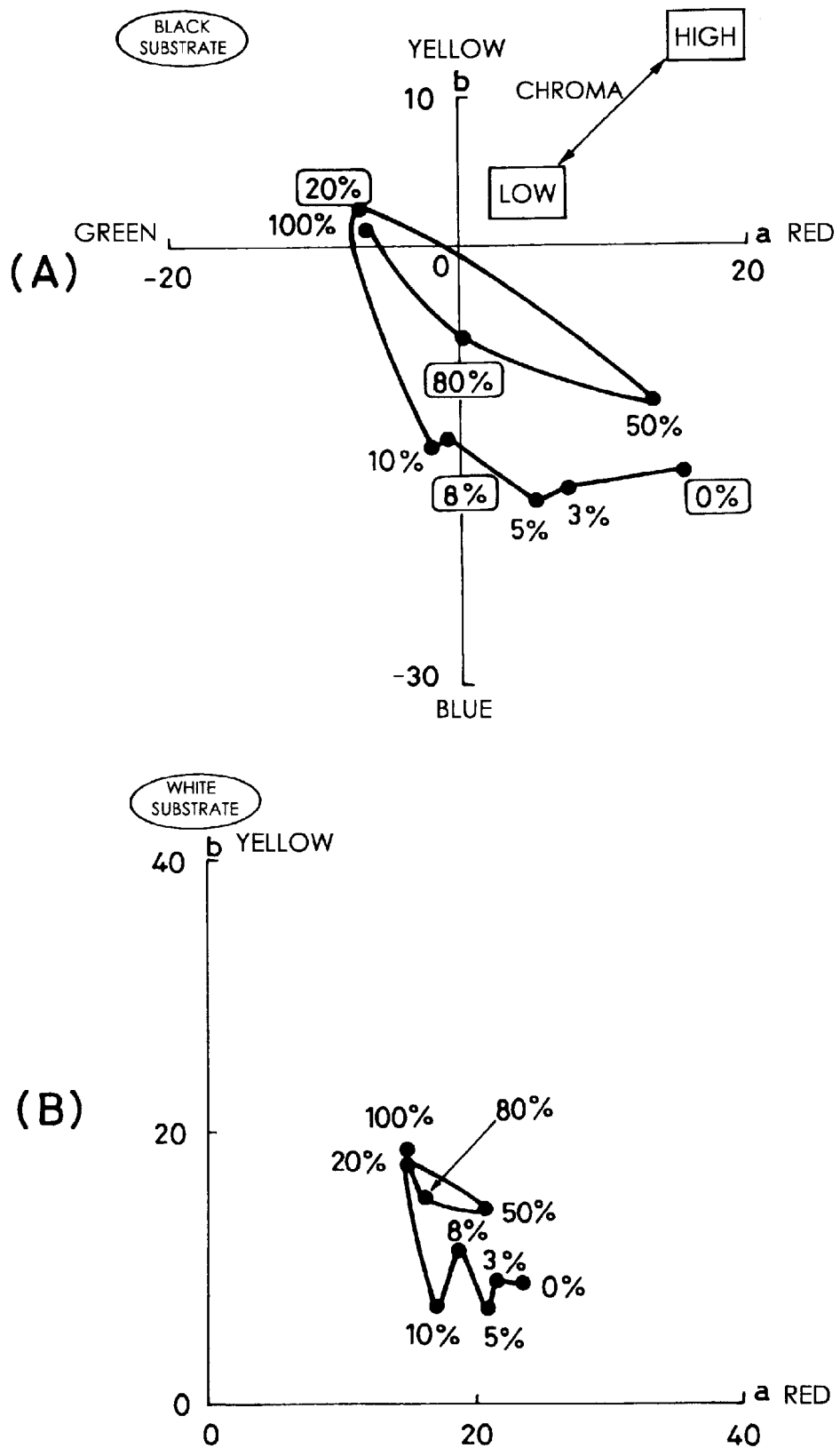
FIG. 4 is an explanatory view, which shows a relationship between an amount and a color tone of titanium dioxide, which is an outermost layer of the pigment in accordance with the present invention.

As is clear from TABLE 9 and FIG. 4, a color tone flip-flop property could be obtained in the case where the coating amount of titanium dioxide to the composite oxide coated mica was within the range of 3 to 100%. Specifically, the observed color turned from red through violet to red again with changing the angle of observation, in the case where the amount of titanium dioxide was 3%. Also, the observed color turned from red through green to red again with changing the angle of observation, in the case where the amount of titanium dioxide was 100%.

On the other hand, a change of the color tone with respect to the products, which was not coated titanium dioxide, was not found in the case where the coating amount of titanium dioxide to the composite oxide coated mica is 2%. Also, the color tone of the products that was coated more than 100% of titanium dioxide became whitish. Therefore, the coating amount of titanium dioxide is preferably 3 to 100%, and more preferably, is 8 to 80%.

In the following, compounding examples that is used the color titanium dioxide coated mica pigment in accordance with the second example will be listed. However, the present invention is not limited thereto. A compounding amount will be expressed by wt % unless otherwise limited.

Compounding Example 2-1 Gravure Ink

| | |
|---|---|
| Color titanium dioxide coated mica pigment | 30.0% |
| Ethylene-vinylacetate copolymer | 7.5 |
| Chlorinated polypropylene | 5.5 |
| Toluene | 28.0 |
| Ethyl acetate | 8.5 |
| Methyl ethyl ketone | 17.0 |
| Isopropyl alcohol | 2.5 |
| Polyethylene wax | 0.8 |
| Antistatic agent | 0.2 |

Compounding Example 2-2 Gravure Ink

| | |
|---|---|
| Color titanium dioxide coated mica pigment | 15.0% |
| Polyamide resin | 15.0 |
| Rosin ester | 4.0 |
| Nitrocellulose | 3.0 |
| Isopropyl alcohol | 46.0 |
| Ethyl acetate | 5.0 |
| Toluene | 10.0 |
| Polyethylene wax | 2.0 |

Compounding Example 2-3 Gravure Ink

| | |
|---|---|
| Color titanium dioxide coated mica pigment | 20.0% |
| Hardened rosin | 15.0 |
| Petroleum resin | 10.0 |
| Toluene | 55.0 |

Compounding Example 2-4 Gravure Ink

| | |
|---|---|
| Color titanium dioxide coated mica pigment | 30.0% |
| Nitrocellulose | 10.0 |
| Butyl cellosolve | 10.0 |
| Naphtha | 25.0 |
| Cyclohexane | 25.0 |

Compounding Example 2-5 Gravure Ink

| | |
|---|---|
| Color titanium dioxide coated mica pigment | 14.0% |
| Ethylene-vinylacetate copolymer | 7.2 |
| Chlorinated polypropylene | 5.8 |
| Toluene | 58.0 |
| Ethyl acetate | 11.0 |
| Isopropyl alcohol | 3.0 |
| Polyethylene wax | 0.8 |
| Antistatic agent | 0.2 |

Compounding example 2-6 Screen Ink

| | |
|---|---|
| Color titanium dioxide coated mica pigment | 15.0% |
| Acrylic resin | 20.0 |
| Naphtha | 35.0 |
| Butyl cellosolve | 30.0 |

Compounding Example 2-7 Screen Ink

| | |
|---|---|
| Color titanium dioxide coated mica pigment | 15.0% |
| Nitrocellulose | 15.0 |
| Cyclohexane | 40.0 |
| Isophorone | 10.0 |
| Naphtha | 10.0 |
| Dibutylphthalate | 10.0 |

Compounding Example 2-8 Screen Ink

| | |
|---|---|
| Color titanium dioxide coated mica pigment | 20.0% |
| Nitrocellulose | 20.0 |
| Cyclohexane | 45.0 |
| Isophorone | 10.0 |
| Dioctylphthalate | 5.0 |

As explained above, according to the color titanium dioxide coated mica in accordance with the second example of the present invention, a different color tone depending on the observed angle can be perceived by forming the composite oxide layer which comprises titanium, iron, and nickel onto mica and further coating the titanium dioxide layer onto the composite oxide layer.

Also, the coated-body of the present invention can clearly demonstrate a color tone flip-flop property by applying the pigment in accordance with the second example of the present invention onto the substrate that has low brightness.

What is claimed is:

1. A color titanium dioxide coated mica pigment which comprises:
    a flaky mica substrate; and
    a titanium, iron and nickel comprising composite oxide that is coated onto said mica substrate, where the composite oxide comprises 60 to 95 wt % of titanium, 1 to 24 wt % of iron and 1 to 24 wt % nickel and the pigment is red to red purple.

2. A color titanium dioxide coated mica pigment according to claim 1, wherein a hue exists in a range of color difference of $\Delta ab=12.00$ (center a:22.04, b: −6.96) in the case where the hue is displayed by Lab of Hunter, and a value of L is within a range of 23.00 to 39.00.

3. A color titanium dioxide coated mica pigment according to claim 1, wherein a hue exists in a range of color difference of $\Delta ab=9.00$ (center a:20.00, b: −10.00) in the case where the hue is displayed by Lab of Hunter, and a value of L is within a range of 23.00 to 39.00.

4. A color titanium dioxide coated mica pigment which comprises:
    a flaky mica substrate; and
    a titanium, iron and nickel comprising composite oxide that is coated onto said mica substrate, where the composite oxide comprises 30 to 60 wt % of titanium, 20 to 48 wt % of iron and 10 to 40 wt % nickel and the pigment exhibits a hue in the range of color difference of $\Delta ab=10.00$ (center a: 7.70, b:8.01)in the case where the hue is displayed by Lab of Hunter and a value of L is within a range of 19.00 to 32.00 and the pigment is yellow to reddish brown.

5. An article comprising a substrate and a coating, wherein the coating comprises the pigment of claim 1 or 4.

6. The article of claim 5 where the substrate has an L value of 70 or less.

7. The article according to claim 6, wherein said substrate is black, blue, or green.

8. A color titanium dioxide coated mica pigment which comprises:

a flaky mica substrate;

a titanium, iron and nickel comprising composite oxide that is coated onto said mica substrate, where the composite oxide comprises 60 to 95 wt % of titanium, 1 to 24 wt % of iron and 1 to 24 wt % nickel; and a titanium dioxide layer that is coated onto said composite oxide layer.

9. A color titanium dioxide coated mica pigment according to claim 8, wherein a coating amount of the titanium dioxide layer that is coated onto said composite oxide layer, is 3 to 100 wt % with respect to the composite oxide coated mica.

10. An article comprising a substrate and a coating, wherein the coating comprises the pigment of claim 8.

11. The article of claim 10 where the substrate has an L value of 70 or less.

12. The article according to claim 11, wherein said substrate is black, blue, or green.

* * * * *